BEER TAPPING DEVICE

Original Filed Oct. 22, 1965 3 Sheets-Sheet 1

INVENTOR
MACK S. JOHNSTON

BY LeBlanc & Shur
ATTORNEYS

BEER TAPPING DEVICE

Original Filed Oct. 22, 1965 3 Sheets-Sheet 2

INVENTOR
MACK S. JOHNSTON

BY LeBlanc & Shur
ATTORNEYS

BEER TAPPING DEVICE

Original Filed Oct. 22, 1965 3 Sheets-Sheet 3

INVENTOR
MACK S. JOHNSTON

BY LeBlanc & Shur
ATTORNEYS

United States Patent Office

Re. 27,626
Reissued Apr. 17, 1973

27,626
BEER TAPPING DEVICE

Mack S. Johnston, Encino, Calif., assignor to
Draft Systems, Inc., Northridge, Calif.

Original No. 3,353,724, dated Nov. 21, 1967, Ser. No. 502,091, Oct. 22, 1965. Application for reissue Nov. 18, 1970, Ser. No. 90,885
Int. Cl. B65d *83/14*
U.S. Cl. 222—400.7 18 Claims

Matter enclosed in heavy brackets [ ] appears in the original patent but forms no part of this reissue specification; matter printed in italics indicates the additions made by reissue.

ABSTRACT OF THE DISCLOSURE

Disclosed is a tapping device for beer kegs and the like and, more particularly, a probe adapter for installation in a beer keg opening. The adapter is provided with a liquid valve opened when a probe is inserted into the adapter. Also forming a part of the adapter is a positive acting gas valve which has a closure member moved by the probe to permit gas to flow into the keg through the adapter. The gas flow path through the adapter is at all times separated from the liquid flow path.

*This application is a continuation-in-part of my copending application, Ser. No. 406,682, filed Oct. 27, 1964, now abandoned in favor of continuing application, Ser. No. 587,627, filed Oct. 18, 1966 (now U.S. Pat. No. 3,422,448, dated Jan. 14, 1969); application, Ser. No. 406,682 being in turn a continuation-in-part of my copending application, Ser. No. 150,982, filed Nov. 8, 1961; said application, Ser. No. 150,982 being abandoned in favor of continuating application, Ser. No. 395,084, filed Sept. 8, 1964, now U.S. Pat. No. 3,231,154, dated Jan. 25, 1966.*

The present invention relates to a new and improved tapping device for drawing fluid such as beer from containers such as beer kegs or barrels, using a gas to drive the fluid from the container, said tapping device including a sub-unit called a "keg adapter" which is sealingly installed in the keg and a second sub-unit called a "coupler" which is attached to the beer dispensing apparatus in a restaurant, tavern or the like and is readily connectible to the keg adapter so that the tapping device is automatically set up in operating condition. More specifically, this invention relates to a new, improved keg adapter which is usable with conventional beer kegs having a standard three-fourths inch (¾") diameter beer removal opening therein and which includes a valve means formed therein that positively prevents gas and/or beer from passing either into or out of the keg whenever the coupler is not assembled with the keg adapter, and in which gas checkvalve means in addition to the liquid valve means are enclosed completely within the keg adapter body.

In the past the most widely prevailing practice in the beer industry has been for the brewery to provide draft beer to retail outlets in "conventional" kegs which have a ¾-inch opening in the top, closed with a bung in the form of a cork or plug. To dispense the beer from the keg, the bartender "taps" the keg by knocking in or pushing in the bung and inserting an elongated tap rod with an associated "siphon" device for drawing the beer from the keg, these being fastened to the keg by means of a "bayonet" or like connection. This siphon device includes means for injecting compressed air or $CO_2$ through the tap rod into the keg to drive the beer up through the siphon, and also external valve means for respectively controlling the flow of gas into the keg and the beer from the keg. A gas supply hose connects the siphon to a source of gas and another hose connects it to the beer dispensing apparatus normally on the counter or bar in the restaurant or tavern, whereby beer may be dispensed from the keg. When the beer has been withdrawn from the keg to the extent feasible, the bartender then removes the tap and siphon device from the keg, removes the keg from the dispenser cabinet, installs a new keg, and repeats the processing of knocking in or pushing in the bung and installing the tap rod and related siphon equipment, etc. The same tap rod and siphon are used for every keg, and must be washed and cleaned periodically to prevent fouling and contamination.

This practice which has been in use for approximately fifty years has a number of disadvantages for the brewery, the dispensing establishment and the public: the open empty kegs often become filled with debris and trash of every sort. Not infrequently, mice or other objectionable things get into the kegs and swell and become difficult to remove through the bung hole. Insects which get into the keg and dry on the inside wall are very difficult to wash off. Also, old yeast and other solids from the beer inevitably accumulate within the currently used conventional tap and siphon arrangements, which results in an accumulation of destructive bacteria feeding on this material. When a new keg is tapped and the gas pressure is applied, the fresh beer surges into uncleaned portions of the tap and siphon device and this causes accumulation of residue of yeast, bacteria, etc. to be washed down into the keg, thus promptly contaminating the carefully brewed product and also destroying its "brewery fresh" flavor. This problem is further aggravated by the fact that in dispensing the beer from the keg, there is a tendency for the beer to surge back and forth into the tap chamber where the old yeast and destructive bacteria have accumulated as varying gas pressure is applied when the dispensing apparatus is operated. Hence, when a keg is tapped with conventional methods, the great care to prepare pure, good quality beer at the brewery probably goes to naught at the dispensing establishment.

Further, when tapping a substantial quantity of beer, it usually surges from the keg, with an economic loss and resulting mess. Then, when the bartender removes the tap rod and siphon arrangement from the empty keg, residual gas pressure in the keg will often cause the tap and siphon unit to pop out suddenly, sometimes injuring the bartender. Moreover, the beer keg is generally kept in a refrigerated unit under the bar, with limited space, as a result of which conventional tapping of the keg by the bartender is somewhat awkward, time consuming and difficult (especially if the bartender is not too strong).

In an attempt to eliminate some of the aforementioned problems, one of the largest United States breweries adopted an alternative tapping device which utilizes a non-conventional keg having an opening in the top with a fitting therein for receiving gas, plus another opening in the side of the keg near the bottom having a fitting therein for dispensing the beer, and this arrangement requires manufacture, installation and coupling of two fittings. Also, the barrel is usually tilted to dispense the beer to a maximum extent, which makes handling more difficult and requires more space. Further, the non-conventional keg and its two fittings are not only more expensive to manufacture, but also introduces problems in high-speed automatic cleaning and filling of the kegs, especially when the brewery is committed to the above-described conventional kegs (as is usually the case). Hence, the above-described conventional tapping arrangement is still in common usage not withstanding its many shortcomings. However, it should be noted that these two aforementioned beer tapping devices are the only ones which have had substantial commercial usage heretofore (prior to 1964). Numerous other beer-tapping devices have been proposed over the past fifty to sixty years, to attempt to obviate the above-mentioned problems without creating others. However, because of their various practical shortcomings, these numerous proposed devices have not gained substantial acceptance in the draft-brew industry, primarily because the designers of these devices did not take into account several important "facts of life" in handling beer. Beer, unlike many other liquids, must be handled with extreme care lest it lose those qualities such as taste, proper head and foam, and freedom from cloudiness, which the public demands. Thus, if the flow path from the keg to the dispensing apparatus is too tortuous or contorted, or if there is too large a pressure drop across the tapping device, caused by a restricted flow path, the beer will become "flat" or "wild" (e.g., too much foam).

Also, most (millions) of the beer kegs and barrels in use in the United States at the present time have a ¾-inch beer dispensing opening in the top and are designed to have their tapping unit connected to the keg by means of a bayonet-type coupling. Therefore, to gain acceptance in the industry a new draft-beer tapping device must be adapted for use with a small standard opening and with the aforementioned means of attachment to the kegs.

However, the problem is not merely one of miniaturization; e.g., if essential industry penetration is to be expected the improved tapping device must be "universal" for use with both high- and low-pressure draft-beer dispensing systems that are utilized in different parts of the United States without adversely affecting the quality of the beer. Still further, an improved draft-beer tapping device must be rugged so as to withstand rough treatment in handling, not only during the travel to and from the breweries but also at the dispensing establishment. In this regard, the device must not only be constructed of strong, durable, non-toxic materials, but it also must be designed so that it will not project from the top of the keg—because it will commonly be knocked off during handling. Furthermore, a portion of the tapping device which remains in the beer keg must be able to be installed in the keg in such a manner that there is absolutely no leakage of gas or beer from the keg either before or after the keg is tapped. Also, the component parts of the portion of the tapping device must be made from materials that are completely immune from corrosive or other attacks by the pressurized beer, so that there will be no functional failure of these components and also so that there is no possibility that objectionable odors or tastes will be imparted to the beer no matter how long the filled keg is stored before it is tapped.

Referring now to my co-pending United States application Ser. No. 395,084, filed Sept. 8, 1964 (which is a continuation of my United States application Ser. No. 150,982, filed Nov. 8, 1961), now abandoned, the above-discussed problems and shortcomings of the prior draft-beer tapping devices have been eliminated by the novel, improved tapping device disclosed and claimed therein. In fact, the improved beer tapping devices as disclosed and claimed in my application Ser. No. 395,084, now Patent Number 3,231,159, have been and are getting unprecedented recognition in the brewery industry as affording a highly successful and practical solution to the above-discussed long-standing problems in the industry, as being usable with unmodified conventional kegs having the standard ¾-inch-diameter openings in the top thereof.

Also, my copending application Ser. No. 406,682, filed Oct. 27, 1964 (as a continuation-in-part of my aforementioned copending applications Ser. No. 395,084 and Ser. No. 150,982), discloses and claims various additional further improvements on the inventions of applications Ser. No. 395,084 and Ser. No. 150,982, as exemplified by FIGURES 9–22 of my said C-I-P application. For example, such improvements disclosed and claimed in my copending application Ser. No. 406,682: (1) have made it possible to use standardized models incorporating the inventions of application Ser. No. 395,084 (and Ser. No. 150,982) with "conventional" beer kegs which, however, have widely varying configurations and dimensions; (2) have made it possible to drive draft beer through the air passages, whereby my invention can be used in "series" multiple-keg beer installations in high-volume dispensaries; (3) avoid "wild" beer, even when using a standardized model with both high- and low-pressure systems, due to the improved liquid valve; and (4) provide other advantages such as an improved picnic pump, Golden Gate adapter, etc., as developed more fully in my C-I-P application Ser. No. 406,682.

Recognition of the merits and advantages of my tapping device inventions by the U.S. brewery industry is illustrated by the considerable commercial penetration and acceptance achieved by these novel tapping devices in the marketplace, not only at the distribution level but also at the retail level, even though such tapping devices have been available for a relatively short time with only minimal advertisement.

While these improved tapping devices embodying the novel features and constructions of my invention, as disclosed and claimed in my United States application Ser. No. 395,084, provide a most advantageous solution—especially with the conventional keys—to the draft-beer industry's long-standing problems, I have invented some other novel and improved tapping devices which are also substantial improvements over other prior tapping units heretofore available.

Accordingly, it is a principal object of this invention to provide a new, improved tapping arrangement for packaging and dispensing of beer and like liquids in kegs or barrels which overcomes the above-discussed and other problems and shortcomings of the beer and draft dispensing systems heretofore available, provides a number of important advantages and improved results as hereinafter amplified, and also provides an acceptable commercial alternative to the improved tapping device disclosed and claimed in my copending U.S. applications Ser. No. 395,084 and Ser. No. 406,682.

Another object of the present invention is to provide an improved tapping arrangement for packaging and dispensing beer for use with conventional beer keg constructions utilizing the standard ¾-inch-diameter beer outlet or tapping hole in the keg.

Another object of the present invention is to provide a novel keg adapter which may be inserted through a standard so-called "Peerless" keg flange from outside of the keg, which adapter effectively seals the keg against leakage during storage and transit. In certain embodiments, the keg adapter of the present invention utilizes, for the most part, only metallic parts except for a plastic coupling ring, internal sealing rings and the beer valve seat. This makes possible a more attractive, efficient and reliable construction for use throughout the beer industry.

A further object of the present invention is to provide a universal beer-tapping system usable in both low- and high-pressure systems conventionally employed in different section of the United States. The unit of the present invention provides a simple and effective arrangement for rapidly tapping the keg and removing the tap when the keg is empty, without fear of injury to the operator which normally accompanies the earlier tapping arrangements employed for the past several decades. That is, the beer kegs are normally provided with an internal pressure of anywhere from 9 to 34 pounds per square inch, and more, in order to retain the carbonic gas in solution in the various beers. Gas in the form of carbon dioxide or air is, of course, constantly supplied to the keg during dispensing to maintain internal keg pressures. Thus the initial tapping of the keg and likewise in the final removal of the tapping device have, in the past, both been accompanied by a certain amount of danger to the bartender because of the elevated pressures within the beer keg. The device of the present invention significantly overcomes these dangers by substantially eliminating any likelihood that the tapping device will be expelled or blown out of the keg, either during assembly or disassembly of the keg tap.

Another object of the present invention is to provide a novel keg adapter having internal sealing means for isolating the liquid and gas flow paths within the keg and adapter unit which is particularly effective in preventing back flow of the beer when the keg is being tapped or when the tapping device is being disassembled after substantially all the beer has been removed from the keg.

Another object of the present invention is to provide a tapping assembly including a keg adapter for incorporation in the keg, which adapter is provided with a novel and improved gas valve permitting gas such as $CO_2$ or the like to flow into the keg but at the same time preventing the beer from flowing through this valve outwardly of the keg into the gas passageways. In this way the collection of bacteria feeding on yeast deposits or other contamination which might otherwise collect in the gas passageways of both the adapter and coupler units is substantially eliminated.

These and further objects and advantages of the invention will be more apparent upon reference to the following specification, claims and appended drawings, wherein:

Figure 1:
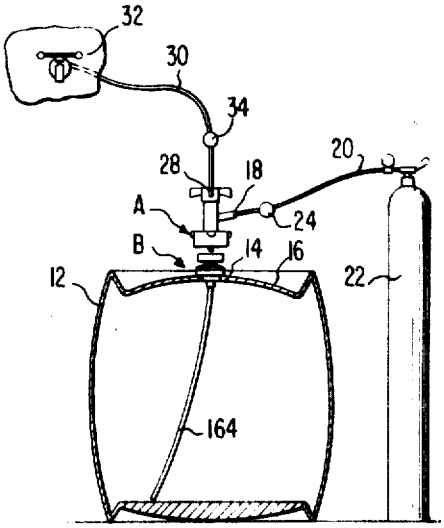
FIGURE 1 is a diagrammatic view of a beer keg and tapping assembly constructed in accordance with the present invention.

Referring now to FIGURE 1, there is schematically shown a conventional beer keg 12 having an opening 14 in its top wall 16 which receives the adapter B of the present invention, this unit being semi-permanently installed in the keg 12 at the brewery. The dispenser coupler unit A of the present invention may be readily connected with the adapter unit B to form a tapping assembly as hereinafter amplified. The dispenser coupler unit A has a gas inlet port and fitting adapted to receive a coupler 18 attached to the end of a gas supply tube 20 which communicates with a gas supply tank 22. If desired, a valve 24 of any suitable conventional type may be placed in the tube 20, adajacent the coupler 18, so that the gas or air pressure may be controlled at the location of the keg 12. The dispenser coupler unit A also has a beer exit fitting 26 (FIGURE 2) which is adapted to receive a suitable conventional coupler 28 attached to the end of a flexible tube 30 by means of which beer is supplied to a conventional dispenser 32. If desired, a suitable valve 34 may be associated with the coupler unit B, in a conventional manner, for controlling the flow of beer from the keg 12. The arrangement of FIGURE 1 is shown merely for the purpose of illustrating the usage of the present invention. Since the components thereof, other than the units A and B, are conventional and do not comprise a part of the present invention, further description thereof is believed unnecessary, as dispensing arrangements for use with the new, improved tapping device of the present invention will be apparent to those skilled in this field in light of the disclosure herein.

Figure 2:
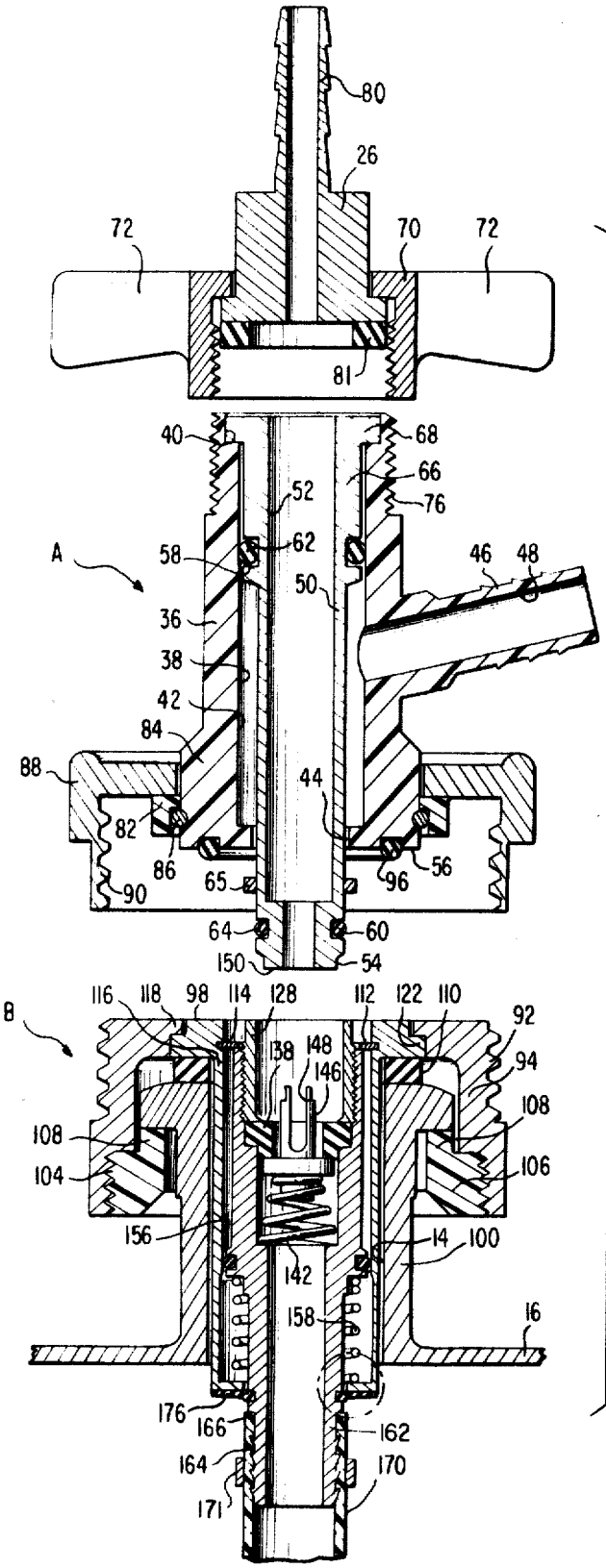
FIGURE 2 is a vertical elevation with parts in cross section showing the separated adapter and coupler units constructed in accordance with one embodiment of the present invention.
Figure 3:
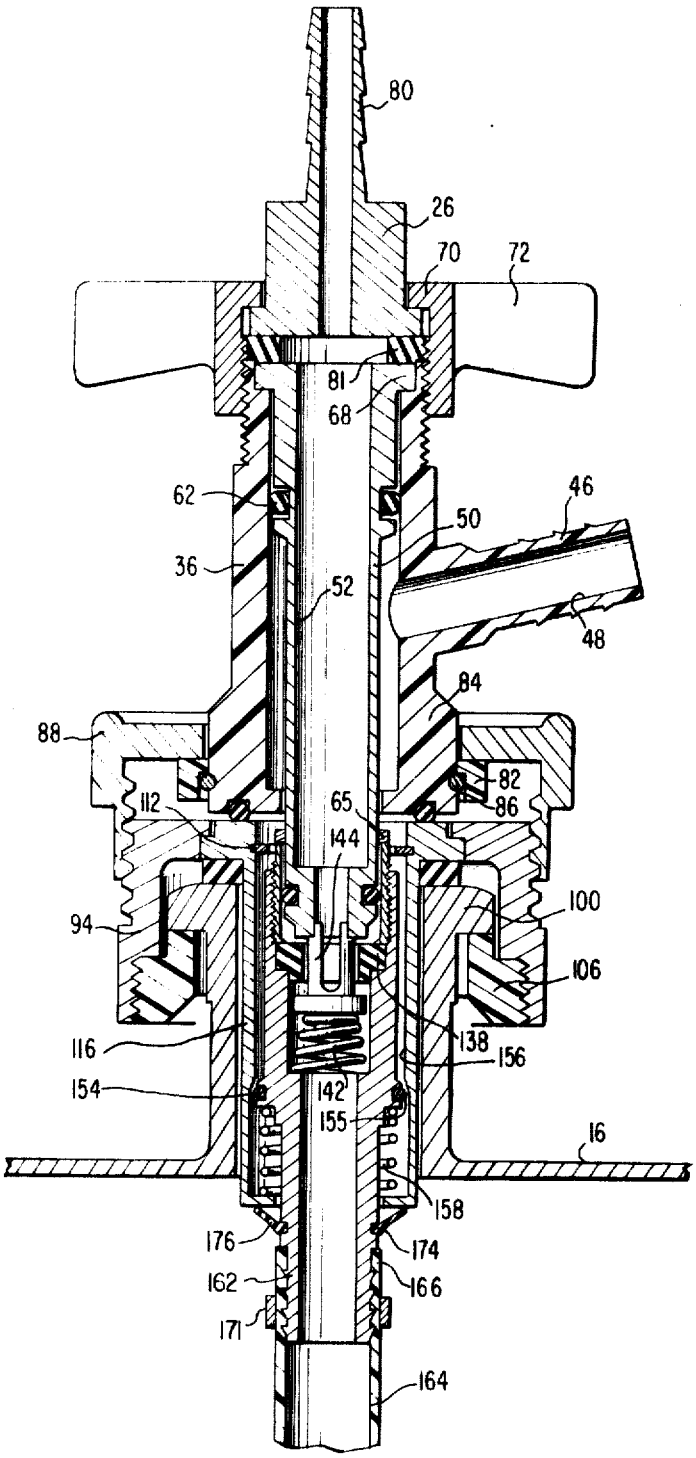
FIGURE 3 is a vertical elevation showing the coupler and adapter units of FIGURE 2 in assembled relation with the beer valve open and ready for dispensing beer.
Figure 4:
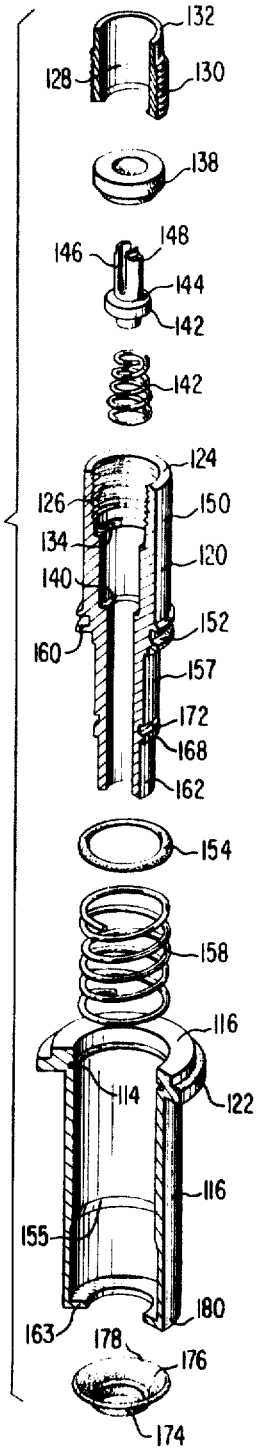
FIGURE 4 is an exploded view of the adapter unit portion of the tapping assembly of FIGURES 2 and 3.

Referring now to FIGURES 2–4, the coupler unit A is similar to the unit disclosed and claimed in my co-pending United States application Ser. No. 406,682, filed Oct. 27, 1964 (which is a continuation-in-part of my aforementioned application Ser. No. 395,084). The unit includes a generally cylindrical head 36 which has a central, vertically extending bore 38 of three diameters indicated at 40, 42 and 44. A tubular arm 46 is preferably formed integral with the head 36 and has a center bore 48 formed therein which comunicates with the bore 38. The arm 46 extends from the head 36 and is adapted to receive the end of tubing that connects the coupler A to a tank of pressurized air or gas, such as the tank 22 shown in FIGURE 1.

The coupler unit A also includes a generally tubular probe 50 which is positioned within the bore 38 and which has a central bore 52 that forms the sole liquid passageway through the coupler unit A. As shown in FIGURE 2, the lower end 54 of the probe extends a substantial distance from the lower end 56 of the head 36 for reasons hereinafter amplified. The exterior of the probe 50 is provide with grooves 58 and 60 for receiving sealing rings 62 and 64 which may be "O-rings" of a neoprene rubber. Also rigidly mounted on the probe is a metal ring 65 for a purpose more fully explained below.

The sealing ring 62 precludes the escape of liquid and gas under pressure from the coupler unit A between the probe 50 and the bore 42. The sealing ring 64 is positioned on the lower end 56 of the probe and prevents intercomunication between the gas and liquid passages in the coupler unit A and the adapter B. Moreover, as shown in FIGURE 2, the outer diameter of the probe 50 is less than the diameters of the bores 42 and 44 so that an air passageway is formed in the head 36, e.g., the air passage consists of the cylindrical central bore 48 of the tubular arm 46 communicating with the annular space between the bores 42 and 44 and the exterior of the probe 50. Thus, the unique cooperation between the head 36, the probe 50 and seals 62 and 64 eliminates the necessity of drilling a separate gas pasageway in the head 36, with resultant savings in manufacturing costs and easier cleaning and maintenance.

As shown in FIGURE 2, the upper, enlarged end 66 of the probe 50 has an outwardly extending flange 68 with an outer diameter and thickness that is substantially equal to the inner diameter and depth of the bore 40 whereby when the probe is positioned within the head 36, the upper end of the probe is in alignment with the top of the head 36.

Again referring specifically to FIGURE 2, if the dispenser coupler A is used in a restaurant, tavern or the like, a conventional cap 70 with integral arms or handles 72 may be connected to the externally threaded portion 76 of the head 36 and cap 70, in the cooperation with sealing gasket 81, secures the probe 50 within the bore 38 in the coupler head A, thereby forcing the lower end of the probe 54 to project sufficiently below the bottom of the coupler head so as to open the beer valve in keg adapter B when a coupler unit A and adapter B are assembled in the manner described hereinafter. The upper end 80 of the fixture 26 is designed so that the end of a flexible tube (such as 30 in FIGURE 1) may be secured to it for interconnecting it with a conventional dispenser utilized in restaurants, taverns and the like (such as shown in FIGURE 1). A neoprene sealing ring 81 is provided between the cap and the top of the coupler head 36.

An anular member 82 is secured about the lower, enlarged end 84 of the coupler head 36 by a metal snap ring 86 and retains a collar 88 on the lower end 84 of the coupler head. Snap ring 86 permits the collar 88 to be quickly removed from the head for easy repair, cleaning or replacement when necessary. The collar is internally threaded at 90 for cooperation with the threaded portion 92 of the annular securing ring 94, shown in FIGURE 2 and hereinafter described, and fits loosely on the head 36, thereby permitting relative rotation between the collar and the head.

The bottom surface 56 of the head 36 carries an annular seal 96, which may be an O-ring of neoprene rubber for providing a seal between the coupler unit A and upper surface 98 of the adapter B. The ring 94 secures the keg adapter B within the keg 12. The seal 96 surrounds the ber and gas passageways formed in the coupler A and the adapter B and prevents leakage of gas and/or beer from between these units when they are in assembled position.

The ring 94 forms the outer portion of the means for securing the keg adapter B in a standard ¾-inch-diameter opening 14 in conventional beer keg 12. This securing means is adapted to cooperate with the standard, so-called "Peerless" beer keg flange 100 on conventional beer kegs, and, as shown in FIGURE 2, is usually integral with the top wall 16 of the beer keg 12. The keg neck portions 100 of "conventional" beer kegs used in the United States vary substantially in configuration and dimensions, thereby making it desirable to secure the keg adapter B in keg 12 by means now referred to.

The keg adapter securing means comprises the ring 94 which, as noted above, is externally threaded at 92 to receive the internally threaded collar 88 secured to the coupler A, and is internally threaded at 104 to receive an externally threaded ring 106 that may be made of plastic or metal. The ring 106 includes a thin wall section with two upwardly projecting, diametrically opposite tabs 108 formed on its inner periphery which are adapted to engage the under side of the flange 100 when the plastic or metal ring 106 is threaded completely within the securing ring 94.

This securing means is fully shown and described in my copending application Ser. No. 406,682 (especially FIGURE 14) and that description is incorporated herein by reference. Suffice it to say that in use the preferably plastic ring 106 is snapped over the keg flange 100 so that it rests on the top of the keg with the tabs 108 extending upwardly therefrom. Keg adapter unit B is inserted from above within the conventional ¾-inch-diameter opening 14 in flange 100. A resilient sealing ring 110 is clamped between the flange 100 and securing ring 94 by way of a main adapter body 116. This ring 110 is positioned at the top of the keg flange 100 and securing ring 94 is then placed over the upper end of the adapter B and the flange 100 as shown in FIGURE 2, and is properly aligned with ring 106 which is then threaded within the ring 94 until the ring 106 is drawn completely within the securing ring 94, with the upper ends of the tabs 108 contacting the under sides of the key flange 100. Thus, when the rings 94 and 106 are assembled as shown in FIGURE 2, they cooperate with the keg flange 100 by clamping the sealing ring 110 between the under sides of the radially inwardly directed portion 118 of the securing ring 94 and the top of the keg flange 100 to securely lock the keg adapter B within the opening of conventional ¾-inch-diameter opening 14 to prevent any longitudinal or rotational movement of the adapter B relative to that opening. That is, internal flange 118 engages flange 122 formed near the upper end of main body 116 to securely lock the main adapter body 116 to the keg flange 100.

Referring now particularly to FIGURES 2, 3 and 4, a metal retaining or snap ring 112 is disposed in the groove 114 formed in the interior surface of the main body 116, which groove is illustrated in FIGURE 4. This snap ring engages the upper end 124 of a slidable beer sleeve or tube 120 positioned within the main body 116 and movable therethrough. The upper end of the beer sleeve 120 is internally threaded, as indicated at 126, to receive a metal insert 128. Insert 128 is provided with external threads 130 adapted to engage threads 124 in the beer sleeve 120 and with an upper end 132 of reduced diameter. The upper end 132 of insert 128 preferably lies in substantially the same plane as the upper surface 198 of main body 116, when the keg adapter B is in keg-sealing condition as illustrated in FIGURE 2. Clamped between the lower end of this insert 128 and internal shoulder 134 of the beer sleeve is a resilient sealing ring and valve seat 138 of suitable resilient material, such as neoprene rubber or the like.

About midway of the beer sleeve is a second internal shoulder 140 which supports the lower end of a coiled compression spring 142, the upper end of which engages the flat closure plate 142 of a liquid or beer valve 144. This valve is provided with a generally U-shaped actuator stem 146 consisting of a pair of spaced legs notched at their upper ends, as at 148, to form shoulders for receiving the lower end 150 of coupler probe 50. When the adapter and coupler are assembled, as illustrated in FIGURE 3, the probe slides over the upper end of the actuator stem 146 so that its lower end engages in the notches 148 to drive the valve plate 144 downwardly away from valve seat 138, all as illustrated in FIGURE 3. Beer sleeve 120 is provided with an annular external groove 152 which receives an annular neoprene O-rinf 154 which acts as a valve for positively valving the gas passage 156 between the inner surface of main body 116 and the outer surface of beer sleeve 120.

Surrounding the lower end or reduced-diameter portion 157 of the slidable beer sleeve 120 is a second, larger coiled compression spring 158 which bears at its upper end against flange 160 and at its lower end against an inturned lower end or flange portion 162 formed on the main adapter body 116. This spring acts to bias the slidable beer sleeve 120 upwardly such that the upper surface 124 of the sleeve engages retainer ring 112 in the manner illustrated in FIGURE 1.

Beer sleeve 120 is provided with an extreme lower end 162 adapted to receive in friction engagement the upper end of a siphon tube 164, also illustrated in FIGURE 1. The siphon tube 164 is preferably flexible and formed of plastic although it may be formed of other materials, including metals such as aluminum or stainless steel, or it may be alternatively formed of rigid plastic materials. The upper end 166 of the siphon tube abuts a flange 168 on the beer sleeve. The beer sleeve or the siphon tube, or both, may be roughened or serrated, as at 170 in FIGURE 1, to improve the friction fit between these two elements, and in addition, suitable adhesive may be applied between them if desired. A clamping ring 171 (optional) may be used to clamp the siphon tube to the beer sleeve.

Figure 2A:
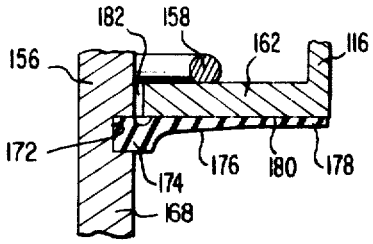
FIGURE 2A is an enlarged view of the gas valve incorporated in the adapter unit of FIGURE 2.

Just above the flange 168 against which the end of the siphon tube abuts, the beer sleeve 120 includes an annular groove 172 in which there is press-fitted annular (square cross-sectioned) inner edge 174 of a flexible gas check valve 176. This valve is provided with an upper annular edge or lip 178 which is biased by the natural resiliency of the material (such as neoprene) from which the valve 176 is formed, against the lower surface 180 of the main adapter body 116. This engagement is illustrated on an enlarged scale in FIGURE 2A. As shown in that figure, the in-turned end 163 of the main body 116 is spaced slightly from the wall 156 of the beer sleeve so as to provide an annular gas passageway 182 between these two elements, from which the gas may pass between the abuting surfaces of elements 163 and the valve 176 into the beer in a manner more fully described below.

In operation of the beer-tapping assembly of FIGURES 1–4 the preferably plastic ring 106 is first snapped over the top of flange 100 of the keg. The adapter assembly is then inserted from the top of the keg through flange aperture 14 to the position illustrated in FIGURE 2. Securing nut 94 is then rotated so that ring 106 is threaded into the under side of the nut and sufficient torque is provided to the securing ring so as to compress sealing ring 110 and lock the entire adapter unit to the keg flange. The unit as thus assembled appears as shown in FIGURE 3.

When it is desired to tap the keg, cap 70 is threaded over the upper end of the coupler unit A and gas line 20 and beer line 30 connected to the respective coupling members 46 and 80. The coupler probe 50 is then inserted into the open mouth of the adapter and the collar 88 threaded onto the securing ring 94 sufficiently so that the lower end 150 of the probe engages the valve stem section 146 driving the valve 144 downwardly away from seat 138 against the action of compression spring 142, thereby opening the beer valve passage. As the beer valve 144 is thus opened, further downward movement of the probe 50 causes the metal ring 65 to engage the top surface 132 of insert 128, thus driving the insert—and the beer sleeve into which it is threaded—downwardly from the position illustrated in FIGURE 2 to the completely coupled position illustrated in FIGURE 3. In this position O-ring 154 is out of engagement, with the inner surface of the main body 116 having passed downwardly below tapered wall 155 into the lower enlarged chamber of the body, thus positively opening the gas flow path which is from the gas inlet bore 48 through the coupler around the probe 50, into the adapter between insert 128 and snap ring 112, through passage 182 between stationary body portion 116 and sliding sleeve 120, and finally outwardly through the resilient gas check valve 176. Downward movement of the beer sleeve carries with it the anchored portion 174 of the gas check valve, whereby this valve assumes a substantially unstressed position with the periphery of lip 178 lightly but firmly engaging the under side of body 116. Thus, a slight excess of incoming gas pressure over the gas pressure within the beer keg will cause the vale 176 to open by displacing annular lip 178 from the under side of body 116 sufficient to permit ingress of gas into the interior of the keg. However, gas pressure within the keg tends to seal the periphery of valve lip 178 against keg-adapter body portions 116, 163, thereby preventing beer from surging into the gas passage 182 and annular gas passage between the exterior of beer tube 120 and interior of cylindrical body portion 116.

When the keg 12 has been substantially completely emptied, the procedure is reversed and the collar 88 is loosened to withdraw probe 50 from the keg adapter B and remove coupler A. When this is done, the beer sleeve 120 moves upwardly, first increasing the bias of resilient gas check valve 176, causing its annular section to press firmly in sealing engagement with surface 180 of adapter body sections 116, 163, and then causing the O-ring 154 to re-engage the inside wall portion 155 under action of spring 158 to positively close the gas passageway through the keg adapter. Further withdrawal movement of probe 50 of coupler A causes spring 142 to close the beer valve 144 so that the interior of the keg 12 is completely sealed off. This closure of the adapter occurs before the coupler collar 88 is completely loosened, so that there is no danger of pressure within the keg causing the coupler to be blown off or driven upwardly during the disassembly of the coupler from the adapter. The collar 88 is then finally loosened to remove the coupler A from keg, whereby it is ready for re-application to another keg full of beer.

Figure 5:
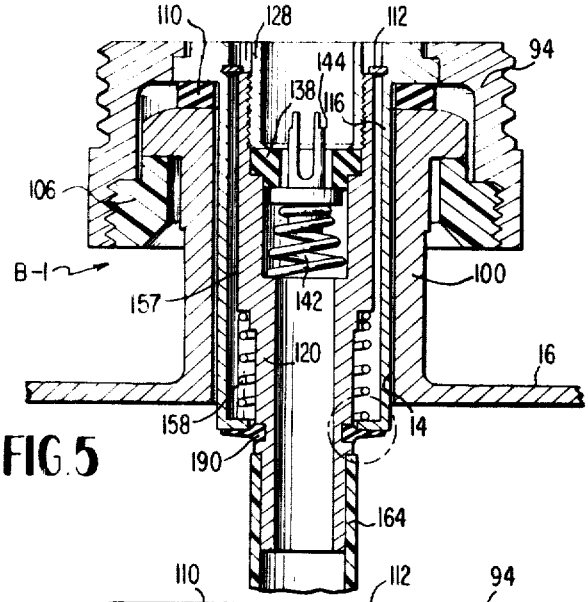
FIGURE 5 is a vertical elevation showing a modified keg adapter construction in accordance with the present invention.
Figure 5A:
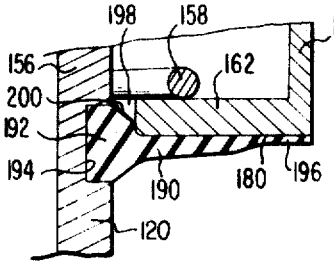
FIGURES 5A and 5B are enlarged views of the gas valve of the adapter unit of FIGURE 5, the former showing the valve prior to tapping and the latter showing the valve subsequent to tapping, i.e., with the adapter and coupler units joined.
Figure 5B:
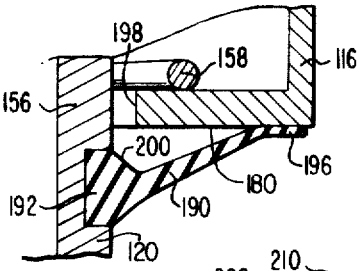

FIGURES 5, 5A and 5B show a modified adapter construction in accordance with the present invention, with like parts bearing like reference numerals in FIGURE 5. The adapter again comprises the keg flange 100, the securing ring 94, ring 106, and sealing gas 100, all cooperating to secure the adapter assembly in the keg aperture 14 against either longitudinal or rotational movement. This embodiment is in all respects similar to the adapter portion of the assembly illustrated in FIGURES 1–4 with the exception that the positive sealing O-ring 154 shown in FIGURES 2 and 3 is omitted and the positive sealing action obtained by a modified gas check valve 190. This gas check valve is similar to the valve 176 of FIGURES 2–4 with the exception that it includes an enlarged annular portion 192 anchored in a suitable enlarged groove 194 in wall 156 of beer sleeve 120. The gas check valve 190 includes an annular lip 196 similar to lip 178 which is biased by the resiliency of the material forming the valve (preferably neoprene) against the under side 180 of adapter body 116. In the embodiment of FIGURES 5, 5A and 5B, a slightly enlarged annular channel 198 is provided for the flow of gas between in-turned end 162 of the body and sleeve wall 156. When the units are uncoupled, this gas flow passage or channel is completely closed off by the enlarged inner annular portion 192 of the valve and specifically by the upwardly projecting, slanted edge portion 200 illustrated in FIGURE 5A. However, when beer sleeve 120 is moved downwardly by a probe being inserted into the adapter unit, valve 190 moves downwardly with respect to body 116 to the position illustrated in FIGURE 5B so that the slanted surface 200 of enlarged portion 192 of the gas check valve moves away from channel 196, completely opening this channel. At the same time, lip 196 still is biased into engagement with under side 180 of body 116, thus providing a gas check valve whereby pressure of the incoming gas slightly in excess of the pressure existing within the keg causes lip 196 to move away from the under side of the body and permits gas to pass inwardly into the keg. However, outward gas and/or beer flow into the gas passage 198, 157 etc. is prevented in the described arrangement shown in FIGURE 5B by means of lip 196, since internal keg pressure exceeding the pressure of the gas from tank 22 causes lip 196 to tightly seal against the under side 180 of adapter body section 116 even when the dispensing coupler A is applied (as in FIGURE 3) thereby displacing the beer sleeve 120 to its lowermost position, as illustrated in FIGURE 5B. Therefore, in the adapter embodiment B–1 of FIGURE 5, the modified gas check valve 190 is relied on for gas-valve control, but the O-ring 154 of FIGURES 1 and 2 is not incorporated in this embodiment.

Figure 6:
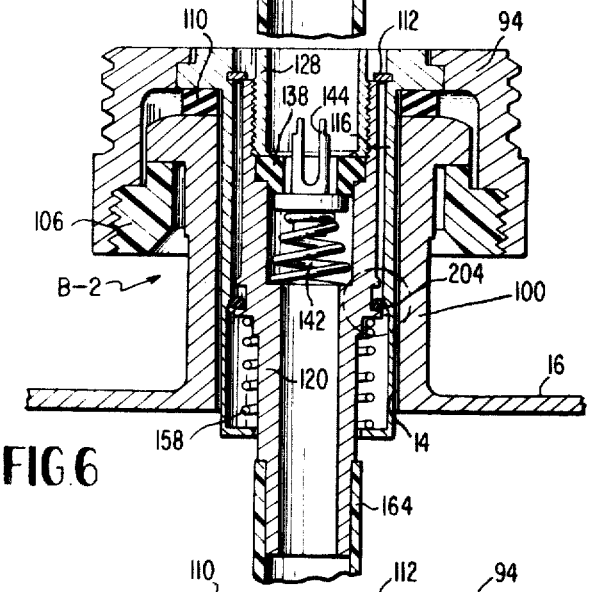
FIGURE 6 is a vertical elevation similar to FIGURE 5 showing a further modification of the keg adapter constructed in accordance with the present invention.
Figure 6A:
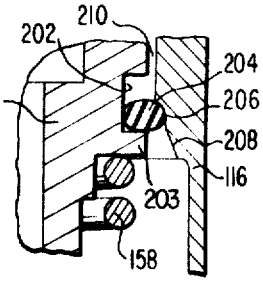
FIGURES 6A and 6B are enlarged views of the internal gas sealing valve incorporated in the adapter of FIGURE 6, with FIGURE 6A illustrating the valve in its pre-tapping position and FIGURE 6B illustrating the valve in the position assumed after the adapter and coupler units are joined.
Figure 6B:
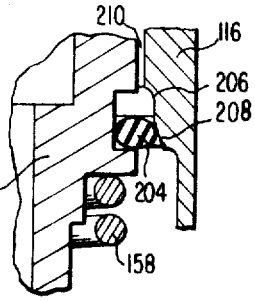

FIGURES 6, 6A and 6B illustrate another modified adapter embodiment B–2 wherein the positive sealing and gas checking action are obtained through use of a novel single O-ring which eliminates need for another gas check valve at the lower end of the main body 116. Again like parts bear like reference numerals, but in the embodiment of FIGURE 6A the beer sleeve 120 is provided with a suitably-sized groove 202 for receiving an oval cross-sectioned annular sealing ring, again preferably made of neoprene rubber. At the same time, the inner wall of body 116 is provided with a double-step or double-transition including a slightly concave annular segment 206 and a straight conical segment 208 flaring outwardly, as illustrated in FIGURES 6A and 6B. When the coupler A is not applied so that adapter beer sleeve 120 is in its uppermost position, per FIGURES 6 and 6A, flange 203 affirmatively causes O-ring 204 to engage the concave section 206 in the inner wall of adapter body 116 to positively seal the gas passageway 210 between the exterior of beer sleeve 120 and interior of adapter body section 116. However, when coupler A is applied to adapter B–2, the beer sleeve 120 is moved downwardly by the coupler probe 50 against the return bias action of spring 158, O-ring 204 moves to the region of outwardly flaring conical section 208 of the wall of adapter body 116. This increases the space accommodating the sealing ring 120, with components being dimensioned so that when the incoming gas pressure from tank 22 in adapter gas passageway 210 sufficiently exceeds the internal pressure within the keg, gas will pass the ring 204 into the interior of the keg. However, the seal 204 will engage the sloping section 208 of adapter body 116, per FIGURE 6B, to prevent beer from surging in the reverse direction into the gas passage of adapter B–2 when the O-ring 204 is in the lower position illustrated in FIGURE 6B. When the probe 50 is displaced upon removal of coupler A, the O-ring 204 returns to its uppermost position, into engagement with section 206, as illustrated in FIGURE 6A, whereby the gas passageway is closed to positively seal the keg 12.

Figure 7:
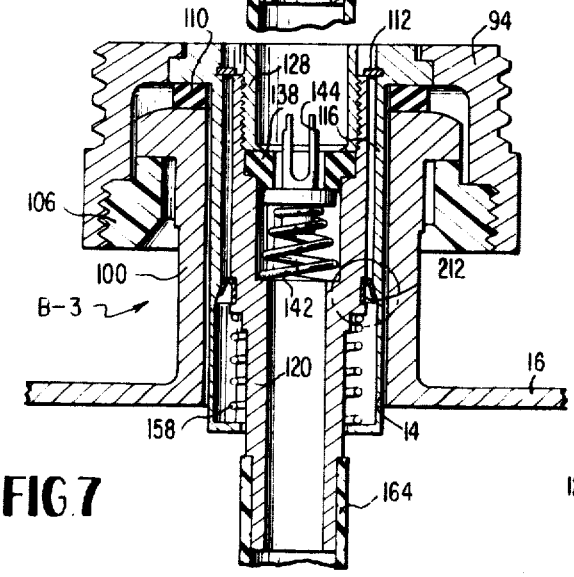
FIGURE 7 is a vertical elevation of a still further modified construction of the adapter unit of the present invention, again incorporating an internal gas valve.
Figure 7A:
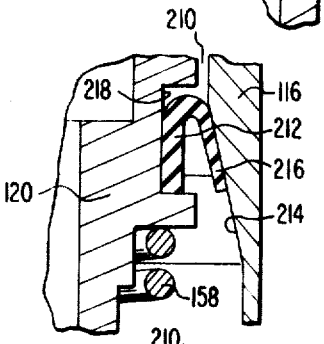
FIGURES 7A and 7B are corresponding enlarged views of the gas valve prior and subsequent to coupling of the units, respectively.
Figure 7B:
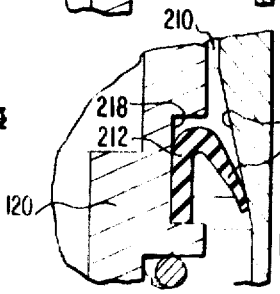

FIGURES 7, 7A and 7B show another modified adapter embodiment B–3 per the present invention, wherein the neoprene O-ring 204 of FIGURE 6 is replaced by a novel annular sealing member 212. Here again the gas check valve at the lower end of body 116 is not required since member 212 provides both the gas check and positive-sealing valve functions of the valves 154 and 176 of FIGURES 2–4. In this embodiment, adapter body 116 is provided with an enlarged conical section 214 against which there bears the outer annular lip 216 of seal member 212, due to appropriate dimensioning and the resilence of the material from which ring seal 212 is formed (e.g., neoprene rubber). The sealing member 212 has an inner annular portion spaced from lip 216 and received in an enlarged annular exterior groove 218 in movable beer sleeve 120. When the probe 50 of coupler A is not inserted in the adapter B–3, so that beer sleeve 12 is in the uppermost position of FIGURES 7 and 7A, outer annular lip 216 of the sealing member 212 tightly engages the surface of annular conical portion 214 to positively close the gas passageway 210 between the sleeve 120 and body 116 to seal the keg 12. However, when coupler A is applied so that the sleeve 120 is depressed by the probe 50, the sealing member 212 moves to the lower position illustrated in FIGURE 7B. In this position, the valve element 212 closely approximates its rest or unstressed condition, but it is designed and dimensioned so that lip portion 216 is biased into engagement with the lower end of transition portion 214. Thus, a slight excess of incoming gas pressure over the pressure within the keg 12 acts to open the periphery of valve element 216 to permit flow of gas into the keg 12; but lip 216 acts to seal against surface 214 when pressure within the keg exceeds gas pressure from tank 22, and thus prevents back surge of beer into the gas passage of adapter B–3.

When coupler A is removed, thus withdrawing the probe 50 and beer sleeve 120 moves to it suppermost position of FIGURE 7A, the gas passage is positively closed by engagement of annular portion 216 against body section 214, thereby sealing the keg.

It is apparent from the above that the present invention provides a novel and improved siphon assembly for beer keg construction, particularly adapted for use in conjunction with standard "Peerless" beer keg flanges having the conventional ¾-inch-diameter opening 14. The adapter unit is inserted from outside the keg, i.e., from the top, through the flange opening and is securely locked in place by a securing ring adapted to threadably receive an associated coupler unit. Important features of the present invention include: the relatively large beer passageways and gas passageways in the limited space available; the provision of novel valving arrangement(s) wherein the movable gas check valve arrangement(s) serve to effectively seal off the gas passageways and thereby seal the keg when the keg adapter and dispensing coupler are disassembled; also, the gas check valves serve to prevent blowout of gas from the keg in initial stages of tapping and during the final stages of disassembly of coupler and adapter; and back flow of beer through the gas passageway is prevented. In the adapter embodiments B–2 and B–3 of FIGURES 6 and 7, respectively, the check valve construction and operation is obtained by means of novel resilient seal elements completely contained within the adapter body 116, thus providing a clean, attractive all-metal appearance for the adapter unit while at the same time providing an optimum coaxial relationship between the central and relatively large and unobstructed beer passageway and the surrounding annular gas flow passageway through both the adapter and coupler units. In addition to optimum utilization of space, these latter features assure that the tapping devices of this invention may be adequately and rapidly cleaned by readily modifying conventional keg-cleaning equipment. The novel valving action of the present invention is obtained through the utilization of a slidable beer sleeve incorporated within the adapter body, which beer sleeve is biased in the upwardly or closed direction by a second coiled spring 158. Downward movement of this beer sleeve under the urging of the probe 50 of coupler A during the final stages of probe insertion causes the valve element to move away from positive gas passageway closing position into positions wherein the valve elements function as one-way check valves for the gas passageways. The limited movement of the beer sleeve 120 permits use of various materials for siphon tube 164 secured to the lower end of beer sleeve 120, with the tube 164 bending, flexing or otherwise moving within the keg to accommodate the movement of the beer sleeve. The unit makes possible the removal of beer from the top of the keg, thus requiring no tilting of the keg; also the adapter may be inserted and removed from outside the keg, i.e., from the top, and is universally usable with standard constructions—and particularly the standard keg openings utilized throughout most of the beer industry in the United States, thus providing important commercial advantages.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

What is claimed and desired to be secured by United States Letters Patent is:

1. A siphon adapter device for installation in a beer keg or like container having top, bottom, and side walls with an aperture in at least one keg wall, whereby the adapter seals said keg and provides means for removal of liquid therefrom, said keg adapter device being characterized in that it comprises: a main fitting member adapted to be secured within the aperture of a keg, with a seal therebetween; a liquid passageway extending through said fitting member to permit passage of fluid from the interior to the exterior of a keg in which said fitting member is installed; a gas passageway extending through said fitting member from the outside to the inside of a keg in which it is installed, said gas passage bypassing said liquid passageway to permit flow of gas toward the inside of a keg; means for providing a siphon tube means communicating with the interior end of the liquid passageway in said fitting member; a normally closed liquid valve in said fitting member including an apertured sealing member, a movable valve closure member adapted to seal with said apertured sealing member with a portion thereof extending through the aperture in said seating member and projecting toward the part of said fitting member disposed to the outside of a keg when installed; means normally urging said closure member against said sealing ring to normally close said liquid valve but permitting it to open upon depressing of said projecting valve portion; said fitting member having a movable substantially tubular sleeve containing said liquid valve, with gas valve means carried by said sleeve for valving said gas passageway according to displacement of said sleeve; said fitting member including a body portion surrounding said movable sleeve and having a gas valve seat section; an annular resilient gas valve member on said sleeve cooperating with said valve seat section; and additional spring means biasing said annular gas valve member against said gas valve seat.

2. A siphon adapter for installation in a keg having top, bottom and side walls with an aperture in at least one keg wall, whereby the adapter seals said keg and provides means for removal of liquid therefrom, said keg adapter being characterized in that it comprises: a main fitting member, means for securing said fitting member within said keg aperture, means for providing a seal between said fitting member exterior and the keg in which the adapter is installed, a liquid passageway extending through said fitting member to permit passage of fluid from the interior of said keg to the exterior thereof, a gas passageway extending through said fitting member from the outside of said keg to the inside thereof, bypassing said liquid passageway to permit flow of gas toward the inside of said keg, siphon tube means connected with the interior end of the liquid passageway in said fitting member, a normally closed liquid valve in said fitting member including an apertured seating member, a movable valve closure member adapted to seal with said apertured seating member and having a portion extending through the aperture in said seating member and projecting toward the fitting member portion disposed to the outside of the keg, whereby depressing said projecting portion opens said normally closed valve, spring means normally urging said closure member against said seating ring to normally close said valve, said fitting member having a movable central beer sleeve housing said liquid valve and valve seat and a stationary body portion surrounding said sleeve, means on said body portion defining a gas valve seat intermediate said sleeve and body portion, an annular resilient gas valve carried by said sleeve, a flange on said sleeve, and resilient means acting on said flange to urge said gas valve against said gas valve seat.

3. An adapter according to claim 2 including a resilient gas check valve on said sleeve, said gas check valve being stressed to resiliently bear against said body portion.

4. An adapter according to claim 3 wherein said gas check valve comprises an annular lip on said gas valve.

5. An adapter according to claim 3 wherein said gas check valve is carried by said sleeve at a location spaced from said gas valve and bears against the under side of said fitting body portion.

[6. A siphon adapter for installation in a keg having top, bottom and side walls with an aperture in at least one keg wall, whereby the adapter seals said keg and provides means for removal of liquid therefrom, comprising, a main fitting member having a tubular body portion and a movable central sleeve, the space between said body portion and sleeve defining a gas passageway into said keg, the interior of said sleeve defining a liquid passageway out of said keg, a liquid valve seat in said sleeve, a liquid valve in said sleeve resiliently bearing on said valve seat, means on said liquid valve for engaging a probe inserted into the end of said passageway to open said liquid valve, resilient gas valving means carried by said sleeve, and spring means acting on said sleeve to urge said resilient gas valving means against said body portion to close off said gas passageway.]

7. An adapter according to claim 6 wherein said gas valving means comprises a gas check valve permitting gas flow through said passageway in only one direction.

[8. An adapter according to claim 6 wherein said gas valving means comprises an annular ring on said sleeve and a valve seat on said body whereby said annular ring positively valves said gas passageway to flow in both directions.]

9. An adapter according to claim 6 wherein said gas valving means comprises both a gas check valve and a positive gas shut-off valve preventing flow in either direction when said sleeve is not moved relative to said body portion.

[10. Liquid storing and dispensing apparatus for beer or the like, comprising, a keg having top, bottom and side walls with an opening in at least one wall, a keg adapter, means for sealingly securing said adapter in said keg opening, said adapter comprising, a main fitting member having a tubular body portion and a movable central sleeve, the space between said body portion and sleeve defining a gas passageway into said keg, the interior of said sleeve defining a liquid passageway out of said keg, a liquid valve seat in said sleeve, a liquid valve in said sleeve resiliently bearing on said valve seat, means on said liquid valve for engaging a probe inserted into the end of said passageway to open said liquid valve, resilient gas valving means carried by said sleeve, and spring means acting on said sleeve to urge said resilient gas valving means against said body portion to close off said gas passageway.]

[11. Apparatus according to claim 10 wherein said gas valving means comprises means for positively closing said gas passageway when said movable sleeve is in a first position, and means acting as a gas check valve for said gas passageway when said sleeve is in a second position.]

[12. A tapping device or siphon for a keg or like container for liquids such as beer which has top, bottom and side walls with an aperture in one wall of said keg, comprising, an adapter for the aperture of said keg whereby the adapter seals said keg and provides means for removal of liquid therefrom, said keg adapter being characterized in that it comprises a main fitting member including a body portion and a central beer sleeve movable longitudinally of said body portion, means for securing said body portion within said keg aperture, means for providing a seal between said body portion exterior and the keg in which the adapter is installed, a liquid passageway extending through said sleeve to permit passage of fluid from the interior of said keg to the exterior thereof, a liquid valve seat in said sleeve, a spring closed liquid valve in said sleeve bearing against said liquid valve seat, a gas passageway extending between said body portion and said sleeve from the outside of said keg to the inside thereof, bypassing said liquid passageway and said liquid valve to permit flow of gas toward the inside of said keg, flexible siphon tube means connected with the interior end of said beer sleeve, a gas valve seat in said gas passageway, a positive gas valve carried by said movable sleeve, means resiliently acting on said sleeve and urging said gas valve into engagement with said gas valve seat, a liquid dispensing coupler connected to said keg adapter, said liquid dispensing coupler comprising a head member having means for opening said normally closed liquid valve in said keg adapter when said dispensing coupler is assembled with said keg adapter, liquid passage means in said coupler head communicating with the interior of said beer sleeve in said adapter to permit the flow of liquid from said keg through said coupler head, gas passage means in said head, and sealing means between said keg adapter and said dispensing coupler whereby one end of said gas passage means in said coupler head is in communication with the gas passageway in said adapter, bypassing said liquid passage means in said keg adapter and said dispensing coupler.]

13. Apparatus according to claim 12 wherein said gas valve comprises resilient annular means carried by said beer sleeve, said gas valve seat being formed by an outwardly flared transition in said body portion of said adapter main fitting member whereby said gas passageway is positively closed when said movable sleeve is in a first position and said gas valve acts as a gas check valve when said movable sleeve is in a second position.

14. Apparatus according to claim 13 including a probe in said coupler head, and means carried by said probe for engaging said movable sleeve when said adapter and coupler are assembled, whereby said engaging means positively drives said beer sleeve from said first to said second position.

*15. A siphon adapater for installation in a keg having top, bottom and side walls with an unthreaded opening in at least one keg wall surrounded by a conventional unthreaded keg neck including a flange extending laterally therefrom and spaced from said one wall whereby the adapter provides means for removal of liquid from the keg, comprising, a main fitting member having a tubular body portion and a movable central sleeve, said tubular body portion having an upper laterally enlarged portion and a lower reduced portion receivable within the keg wall opening with the laterally enlarged portion adapted to overly the keg neck flange, the space between said body portion and said sleeve defining a gas passageway into said keg, the interior of said sleeve defining a liquid passageway out of said keg, a liquid valve seat in said sleeve and a liquid valve in said sleeve resiliently bearing on said valve seat, means on said liquid valve for engaging a probe inserted into the end of said passageway to open said liquid valve, resilient gas valving means carried by said sleeve, spring means acting on said sleeve to urge said resilient gas valving means against said body portion to close off said gas passageway, retaining means for securing said siphon adapter within the keg opening with said lower reduced portion of said adapter lying within the keg neck, said retaining means including a generally annular portion substantially coaxially arranged with said tubular body portion and releasably engageable with said upper laterally enlarged portion, said annular portion being adapted to surround the keg neck flange when the adapter is installed in the keg, said retaining means further including a pair of laterally inwardly extending projections for underlying the keg flange to clamp the keg neck flange between said upper laterally enlarged portion and said projections, and sealing means adapted to be disposed about the keg opening between the keg neck and said body portion whereby the adapter seals said keg about the opening.*

*16. A siphon device including an adapter according to claim 15 wherein said liquid valve is carried by said sleeve, a liquid dispensing coupler including a head, means for connecting said coupler to said adapter including an internally threaded collar rotatably carried by said coupler head, said annular portion having an externally threaded portion for threadedly receiving the internally threaded collar, said coupler head including a probe for opening said liquid and gas valves in said adapter when said dispensing coupler is connected to said adapter, said probe defining a portion of a liquid passage through the coupler head in communication with said liquid passageway in said adapter when said coupler is connected to said adapter, a gas passage in said coupler head in communication with said gas passageway in said adapter when said coupler is connected to said adapter, and sealing means cooperable with said coupler and said adapter for maintaining said liquid and gas passages segregated one from the other when said coupler is connected to said adapter.*

*17. A siphon adapter according to claim 15 in combination with a keg having top, bottom and side walls with an unthreaded opening in said top wall surrounded by a conventional unthreaded keg neck, said opening having a diameter of about ¾ inch, said neck including an interrupted flange defining two flange portions extending laterally from the keg neck and spaced from said top wall, said projections being receivable between said flange portions and engaging the underside of said flange portions upon rotation thereof.*

*18. The adapter according to claim 15 wherein said liquid valve seat in said sleeve lies wholly within said tubular body portion, said sealing means comprising a resilient ring-like member surrounding a portion of said body portion and adapted to bear against the keg neck about the keg opening.*

*19. The adapter according to claim 15 wherein said gas valving means comprises a sealing ring on said sleeve and a valve seat on said body portion whereby said ring positively valves said gas passageway for flow in both directions.*

*20. An adapter according to claim 19 wherein said gas valve seat comprises an interior wall portion of said tubular body portion, said tubular body portion being of enlarged interior diameter below said interior wall portion, said sealing ring being carried by said sleeve for sealing engagement about said interior wall portion when said sleeve lies in a first position, said sleeve being movable into a second position wherein said sealing ring is located in the enlarged diameter portion of said tubular body portion to open said gas valve and permit ingress of gas through the gas passageway into the keg, said spring means including a spring axially biasing said sleeve into said first position, an element releasably secured adjacent the upper end of said fitting member, said sleeve being engageable against said element for retaining the former within said body portion in said first position against the bias of said spring.*

*21. A siphon adapter for installation in a keg having top, bottom, and side walls with an unthreaded opening in at least one keg wall surrounded by a conventional unthreaded keg neck including a flange extending laterally therefrom and spaced from said one wall whereby the adapter provides means for removal of liquid from the keg, comprising, a main fitting member having a tubular body portion and a movable central sleeve, said tubular body portion having an upper laterally enlarged portion and a lower reduced portion receivable within the keg wall opening with the laterally enlarged portion adapted to overly the keg neck flange, the space between said body portion and said sleeve defining a gas passageway into said keg, the interior of said sleeve defining a liquid passageway out of said keg, a liquid valve seat in said sleeve and a liquid valve in said sleeve resiliently bearing on said valve seat, means on said liquid valve for engaging a probe inserted into the end of said passageway to open said liquid valve, resilient gas valving means carried by said sleeve, spring means acting on said sleeve to urge said resilient gas valving means against said body portion to close off said gas passageway, retaining means for securing said siphon adapter within the keg opening with a portion of each of said liquid and gas passageways in said body portion lying within the keg neck, said retaining means including a generally annular portion substantially coaxially arranged with said tubular body portion and releasably engageable with said upper laterally enlarged portion, said annular portion being adapted to surround the keg neck flange when the adapter is installed in the keg, said retaining means further including a laterally inwardly extending projection for underlying the keg flange to clamp the keg neck flange between said upper laterally enlarged portion and said projection, and sealing means adapted to be disposed about the keg opening between the keg neck and said body portion whereby the adapter seals said keg about the opening.*

*22. A siphon device including an adapter according to claim 21 wherein said liquid valve is carried by said sleeve, a liquid dispensing coupler including a head, means for connecting said coupler to said adapter including an internally threaded collar rotatably carried by said coupler head, said annular portion having an externally threaded portion for threadedly receiving the internally threaded collar, said coupler head including a probe for opening said liquid and gas valves in said adapter when said dispensing coupler is connected to said adapter, said probe defining a portion of a liquid passage through the coupler head in communication with said liquid passageway in said adapter when said coupler*

*is connected to said adapter, a gas passage in said coupler head in communication with said gas passageway in said adapter when said coupler is connected to said adapter, and sealing means cooperable with said coupler and said adapter for maintaining said liquid and gas passages segregated one from the other when said coupler is connected to said adapter.*

*23. A siphon adapter according to claim 21 in combination with a keg having top, bottom and side walls with an unthreaded opening in said top wall surrounded by a conventional unthreaded keg neck, said opening having a diameter of about ¾ inch, said neck including an interrupted flange defining two flange portions extending laterally from the keg neck and spaced from said top wall, said projection being receivable between said flange portions and engaging the underside of one of said flange portions upon rotation thereof.*

References Cited

The following references, cited by the Examiner, are of record in the patented file of this patent or the original patent.

UNITED STATES PATENTS

| | | | |
|---|---|---|---|
| 614,465 | 11/1898 | Habermann. | |
| 2,223,012 | 11/1940 | Wanderski et al. | |
| 3,035,603 | 5/1962 | Jamieson et al. | 222—400.7 |
| 2,715,780 | 8/1955 | Frick | 222—494 X |
| 3,231,149 | 1/1966 | Yuza | 222—494 X |
| 3,272,404 | 9/1966 | Graves | 222—400.7 X |
| 3,065,883 | 11/1962 | Nelson | 222—399 X |
| 3,065,885 | 11/1962 | Chatten | 222—400.7 |

FOREIGN PATENTS

| | | |
|---|---|---|
| 930,015 | 7/1963 | Great Britain. |

STANLEY H. TOLLBERG, Primary Examiner

Disclaimer

Re. 27,626.—*Mack S. Johnston*, Encino, Calif. BEER TAPPING DEVICE. Patent dated Apr. 17, 1973. Disclaimer filed June 11, 1973, by the assignee, *Draft Systems, Inc.*

Hereby disclaims the portion of the term of the patent which extends beyond Jan. 25, 1983.

[*Official Gazette April 29, 1975.*]